United States Patent
Chui et al.

(10) Patent No.: US 10,209,677 B2
(45) Date of Patent: Feb. 19, 2019

(54) SYSTEM AND METHOD OF USER INPUT UTILIZING A ROTATABLE PART

(71) Applicant: Samsung Electronics Co., Ltd., Suwon-si, Gyeonggi-do (KR)

(72) Inventors: Kenny Chui, Campbell, CA (US); Venkata Naga Vamsi Nandanavanam, Fremont, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/354,689

(22) Filed: Nov. 17, 2016

(65) Prior Publication Data
US 2017/0308040 A1    Oct. 26, 2017

Related U.S. Application Data

(60) Provisional application No. 62/327,795, filed on Apr. 26, 2016.

(51) Int. Cl.
| | |
|---|---|
| *H04W 4/80* | (2018.01) |
| *G04G 21/00* | (2010.01) |
| *G04B 19/22* | (2006.01) |
| *G06F 3/0362* | (2013.01) |
| *H04L 29/06* | (2006.01) |
| *H04W 12/06* | (2009.01) |
| *H04W 12/08* | (2009.01) |
| *G08B 25/00* | (2006.01) |
| *H04L 29/08* | (2006.01) |
| *H04W 12/02* | (2009.01) |

(52) U.S. Cl.
CPC ............ *G04G 21/00* (2013.01); *G04B 19/223* (2013.01); *G06F 3/0362* (2013.01); *G08B 25/006* (2013.01); *H04L 63/083* (2013.01); *H04L 63/107* (2013.01); *H04L 67/12* (2013.01); *H04W 4/80* (2018.02); *H04W 12/02* (2013.01); *H04W 12/06* (2013.01); *H04W 12/08* (2013.01); *G08B 25/008* (2013.01); *H04L 63/20* (2013.01)

(58) Field of Classification Search
CPC .............................. G04G 5/04; G04G 9/0005
USPC ........................................................... 340/5.5
See application file for complete search history.

(56) References Cited

U.S. PATENT DOCUMENTS

| | | | |
|---|---|---|---|
| 7,113,090 B1 * | 9/2006 | Saylor | .............. G08B 13/19682 340/5.33 |
| 9,024,865 B2 | 5/2015 | Linsky et al. | |
| 9,274,507 B2 | 3/2016 | Kim et al. | |

(Continued)

*Primary Examiner* — Vernal U Brown
(74) *Attorney, Agent, or Firm* — Innovation Counsel LLP

(57) ABSTRACT

An electronic device according to an embodiment comprises a display unit configured to display a current value among a predetermined plurality of ordered values and a rotatable part configured to be rotatable clockwise and counterclockwise. The electronic device also comprises a computer processor configured to: change the current value being displayed to a next value among the plurality of ordered values in response to detecting the rotable part being rotated a first predetermined number of degrees clockwise, change the current value being displayed to a previous value among the plurality of ordered values in response to detecting the rotatable part being rotated counterclockwise by the first predetermined number of degrees, and accept the current value being displayed as a user input value in response to detecting a change in rotation direction of the rotatable part.

14 Claims, 6 Drawing Sheets

(56) References Cited

U.S. PATENT DOCUMENTS

| | | |
|---|---|---|
| 2002/0101457 A1* | 8/2002 | Lang .................... G06F 1/163 |
| | | 715/856 |
| 2011/0106736 A1 | 5/2011 | Aharonson et al. |
| 2014/0047525 A1* | 2/2014 | Bonhoff ................ G06F 21/36 |
| | | 726/7 |
| 2014/0139454 A1 | 5/2014 | Mistry et al. |
| 2015/0098309 A1 | 4/2015 | Adams et al. |
| 2015/0134954 A1 | 5/2015 | Walley et al. |
| 2015/0145653 A1 | 5/2015 | Katingari et al. |
| 2016/0043905 A1 | 2/2016 | Fiedler |
| 2016/0057268 A1 | 2/2016 | Jiang |
| 2016/0091867 A1 | 3/2016 | Mansour et al. |

* cited by examiner

SYSTEM AND METHOD OF USER INPUT UTILIZING A ROTATABLE PART

CROSS-REFERENCE TO RELATED APPLICATIONS

This application claims priority to and the benefit of U.S. Provisional Patent Application No. 62/327,795, titled "SYSTEM AND METHOD FOR PROVIDING A SECURITY HUB" and filed on Apr. 26, 2016, the entire content which is incorporated herein by reference

RELATED FIELD

The present disclosure relates in to a system and method of user input utilizing a rotatable part.

BACKGROUND

As technology advances, smarter electronic devices are able to take smaller form factors. Take smart watches, for example, which are now able to perform tasks that were previously unimaginable for traditional watches. Many smart watches today are capable of connecting to the Internet and communicating with and controlling other devices. However, due to the small form factor of smart watches and other wearable devices, it is often cumbersome for a user to input information into the device, as incorporating a traditional keyboard would not be feasible. Thus, in view of the foregoing, there exists a need for the presently disclosed system and method of user input.

SUMMARY

According to an example embodiment, an electronic device having a display unit, a rotatable part, and a computer processor is disclosed. The display unit is configured to display a current value among a predetermined plurality of ordered values, and the rotatable part is configured to be rotatable clockwise and counterclockwise. The computer processor is configured to: change the current value being displayed to a next value among the plurality of ordered values in response to detecting the rotatable part being rotated a first predetermined number of degrees clockwise, change the current value being displayed to a previous value among the plurality of ordered values in response to detecting the rotatable part being rotated counterclockwise by the first predetermined number of degrees, and accept the current value being displayed as a user input value in response to detecting a change in rotation direction of the rotatable part.

According to another example embodiment, a method of receiving user input values on an electronic device is disclosed. The method includes: displaying a current value among a predetermined plurality of ordered values; detecting degrees of clockwise and counterclockwise rotation of a rotatable part; changing the current value being displayed to a next value among the plurality of ordered values in response to detecting the rotatable part being rotated a first predetermined number of degrees clockwise; changing the current value being displayed to a previous value among the plurality of ordered values in response to detecting the rotatable part being rotated counterclockwise by the first predetermined number of degrees; and accepting the current value being displayed as a user input value in response to detecting a change in rotation direction of the rotatable part.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

Figure 1:
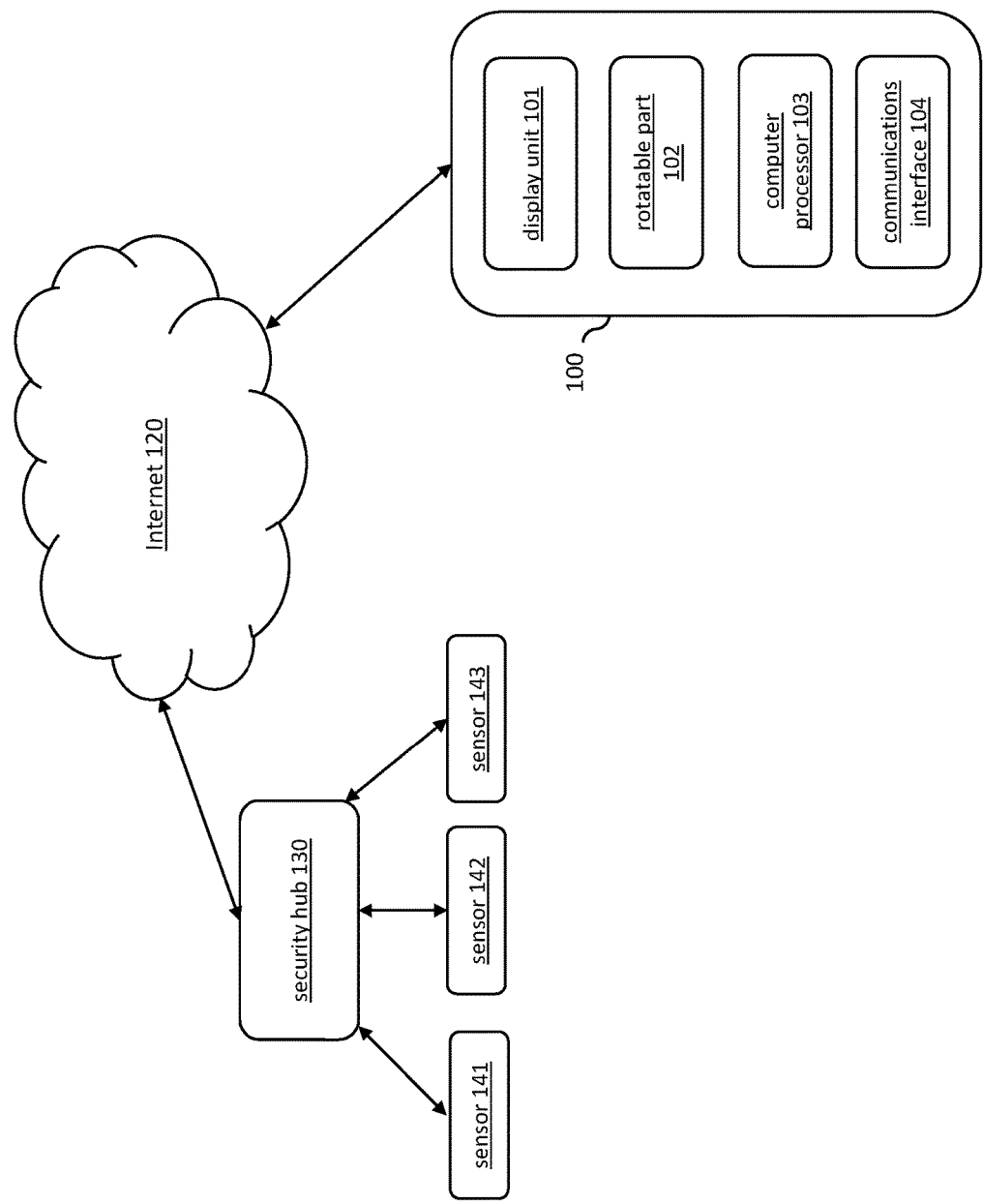
FIG. 1 is a block diagram depicting an implementation of the present system and method of user input utilizing a rotating part, according to an example embodiment of the disclosure.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

As discussed earlier, it is often cumbersome for a user to input information into an electronic device that has a small form factor. Embodiments of the present disclosure provide an intuitive system and method of user input utilizing a rotatable part.

FIG. 1 is a block diagram depicting an implementation of the present system and method of user input utilizing a rotating part, according to an example embodiment of the disclosure. An electronic device 100 includes a display unit 101, a rotatable part 102, a computer processor 103, and a communications interface 104. Although four components of the electronic device are shown, embodiments of the present disclosure are not limited thereto.

The display unit 101 is configured to display a current value among a predetermined plurality of ordered values. As an example, the plurality of ordered values may be numbers (e.g., 0 to 9). As another example, the plurality of ordered values may be alphabetical characters (e.g., A to Z).

Figure 2:
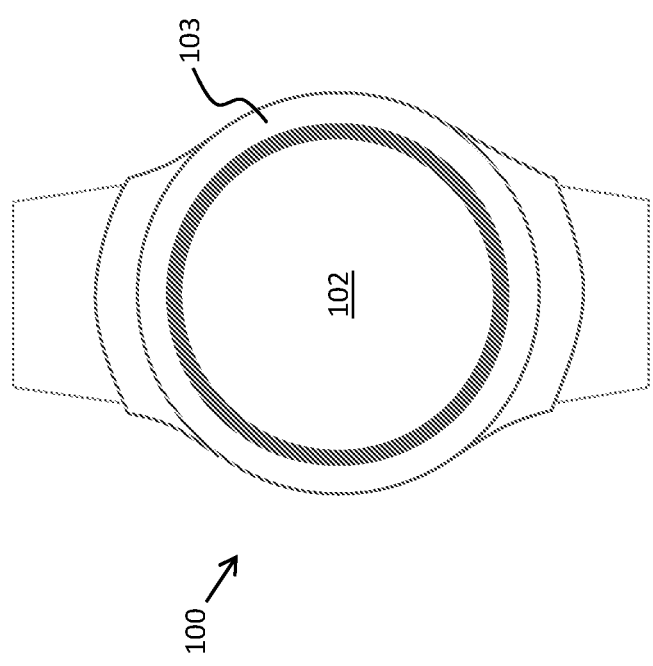
FIG. 2 shows a smart watch having a bezel as a rotatable part, according to an example embodiment of the present disclosure.

The rotatable part 102 is configured to be rotatable clockwise and counterclockwise. As an example, the rotatable part 103 may be a rotatable bezel on a smart watch, such as shown in FIG. 2. As another example, the rotatable part 103 may be a rotatable knob.

According to a first embodiment, the computer processor 103 may be configured to change the current value being displayed to a next value among the plurality of ordered values in response to detecting the rotatable part being rotated clockwise by a first predetermined number of degrees and to change the current value being displayed to a previous value among the plurality of ordered values in response to detecting the rotatable part being rotated counterclockwise by the first predetermined number of degrees. Alternately, according to a second embodiment, the computer processor 103 may be configured to change the current value being displayed to a next value among the plurality of ordered values in response to detecting the rotatable part being rotated counterclockwise by the first predetermined number of degrees and to change the current value being displayed to a previous value among the plurality of ordered values in response to detecting the rotatable part being rotated clockwise by the first predetermined number of degrees.

Figure 3:
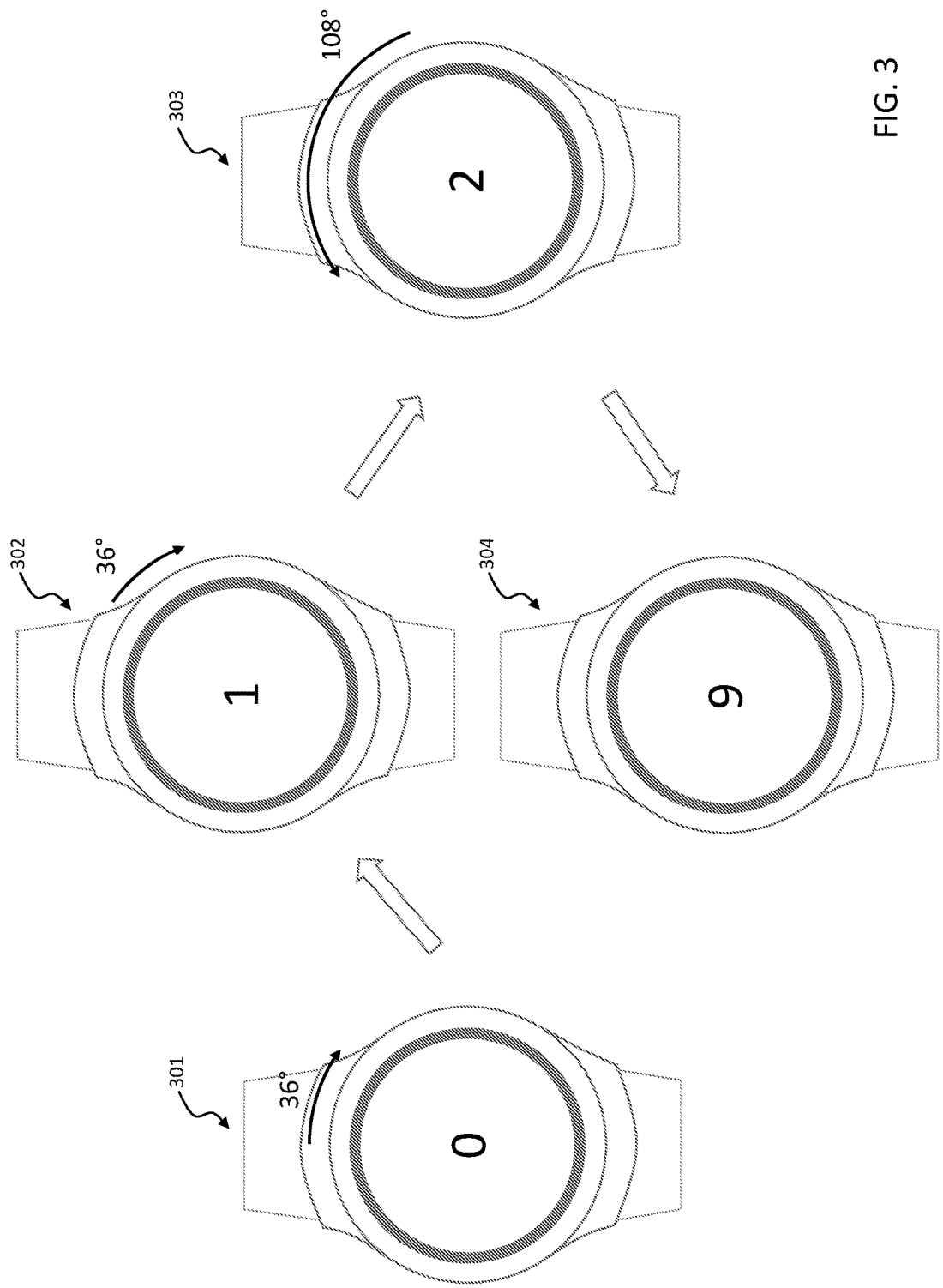
FIG. 3 shows a smart watch in which the currently displayed value changes in response to the bezel being rotated, according to an example embodiment of the present disclosure.

For example, consider the case in which the plurality of ordered values is the set of numbers {0, 1, 2, 3, 4, 5, 6, 7, 8, 9} and the currently displayed value is "0" (at 301). According to the first embodiment, which is shown in FIG. 3, if a user rotates the rotatable part clockwise by 36 degrees (e.g, 360 degrees/10 values=36 degrees/value) from its initial position, the computer processor may change the currently displayed value from "0" to "1," the next value after "0" in the ordered set of values (at 302). If the user rotates the rotatable part clockwise by another 36 degrees, the computer processor may change the currently displayed value from "1" to "2," the next value after "1" in the ordered set of values (at 303). If the user then changes the rotation direction and rotates the rotatable part counterclockwise by 108 degrees, the computer processor may change the currently displayed value from "2" to "9" (at 304). In other words, the ordering of the plurality of values may be circular, such that the next value after "9" is "0."

The computer processor 103 is also configured to accept the current value being displayed as a user input value in response to detecting a change in rotation direction of the rotatable part. As an example, consider the case of FIG. 3 discussed above. Because the user changed the rotation direction from clockwise to counterclockwise while the currently displayed value is "2," the computer processor 102 accepts the currently displayed value "2" as the user input value, which may be entered as part of a passcode, such as described below in further detail with reference to FIG. 5.

According to an example embodiment, the communications interface 104 is configured to communicate with a security hub 130 via the Internet 120. The security hub 130 is communicatively connected to a plurality of sensors 141, 142, and 143 and receives detection information therefrom. The sensors, for example, may be different types of sensors, such as security camera, a microphone, a contact sensor, etc. Also, the number of sensors is not limited to those shown in FIG. 1.

The computer processor 103 may communicate with and control the security hub 130 through the communications interface 104. For example, the computer processor 103 may change a security mode of the security hub in response to detecting the rotatable part being rotated clockwise or counterclockwise by a second predetermined number of degrees (e.g., 360 degrees). The computer processor 103 may change the security mode to an away mode in which the security hub 130 triggers an alarm in response to receiving sensor detection information from the plurality of sensors 141, 142 and 143. The computer processor 103 may also change the security mode to a home mode in which the plurality of sensors 141, 142 and 143 are partially or substantially deactivated.

For example, if the user is away from his/her home and wants to change the security mode on the security hub installed in his/her home, he/she may turn the bezel on the smart watch clockwise by substantially 360 degrees to change the security mode of the security hub to the away mode. Thus, when one or more of the sensors connected to the security hub detects activity and sends detection information to the security hub, the security hub can determine whether to trigger an alarm. Prior to changing the security mode, the user may turn the bezel clockwise or counterclockwise by a predetermined number of degrees to complete a combination or passcode to verify that the user is authorized to modify the security modes.

Figure 4:
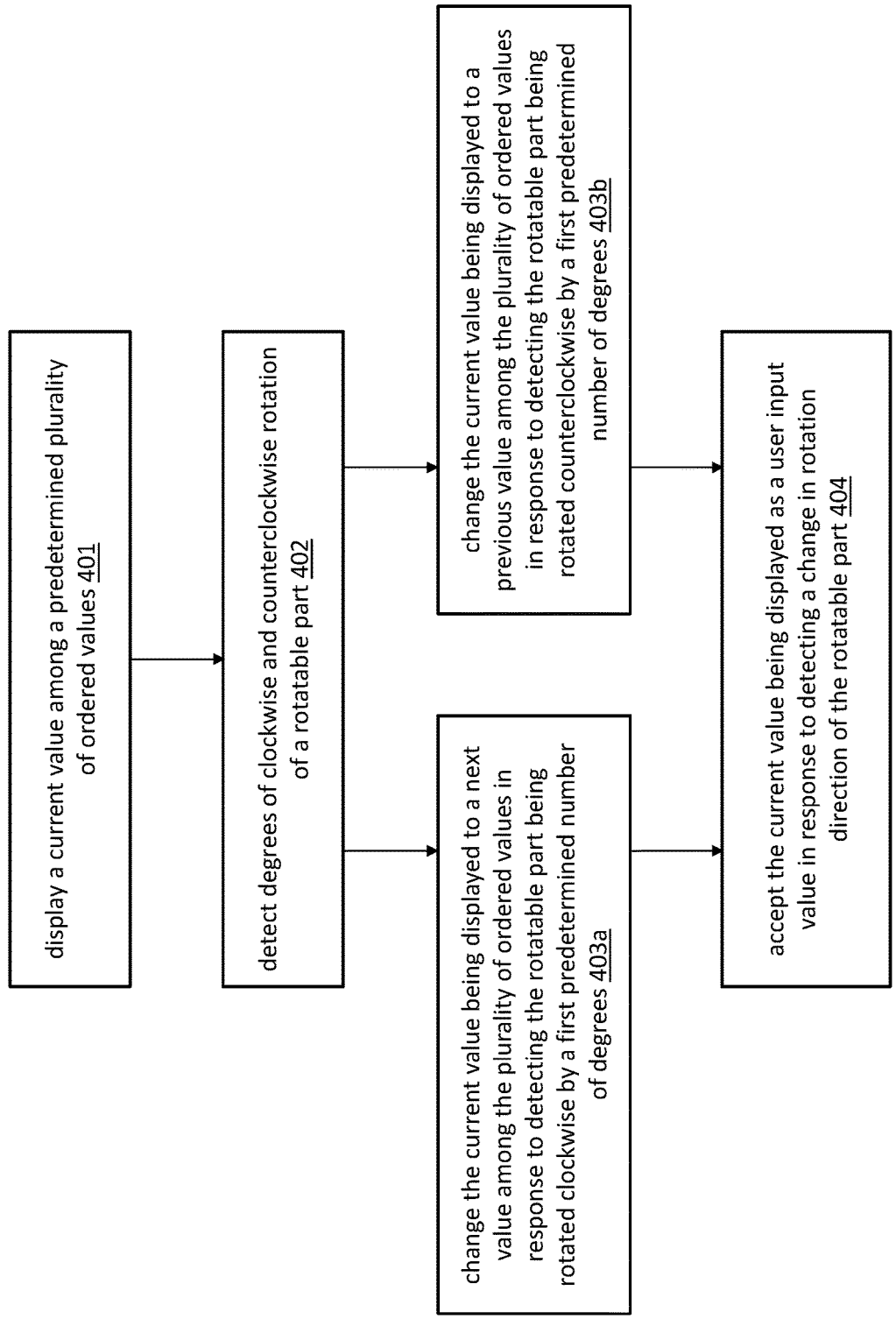
FIG. 4 shows a high-level flowchart of a method of receiving user input, according to an example embodiment of the present disclosure.

FIG. 4 shows a high-level flowchart of a method of receiving user input, according to an example embodiment of the present disclosure. Although one or more components of the electronic device 100 are described below as performing the disclosed operations, the present system and method are not limited thereto, and other components of the electronic device 100 may perform those operations instead or in conjunction.

The display unit of the electronic device displays a current value among a predetermined plurality of ordered values (at 401). The computer processor of the electronic device detects degrees of clockwise and counterclockwise rotation of a rotatable part (at 402). The computer processor changes the current value being displayed to a next value among the plurality of ordered values in response to detecting the rotatable part being rotated clockwise by a first predetermined number of degrees (at 403a). The computer processor changes the current value being displayed to a previous value among the plurality of ordered values in response to detecting the rotatable part being rotated counterclockwise by the first predetermined number of degrees (at 403b). The computer processor accepts the current value being displayed as a user input value in response to detecting a change in rotation direction of the rotatable part (at 404).

Figure 5:
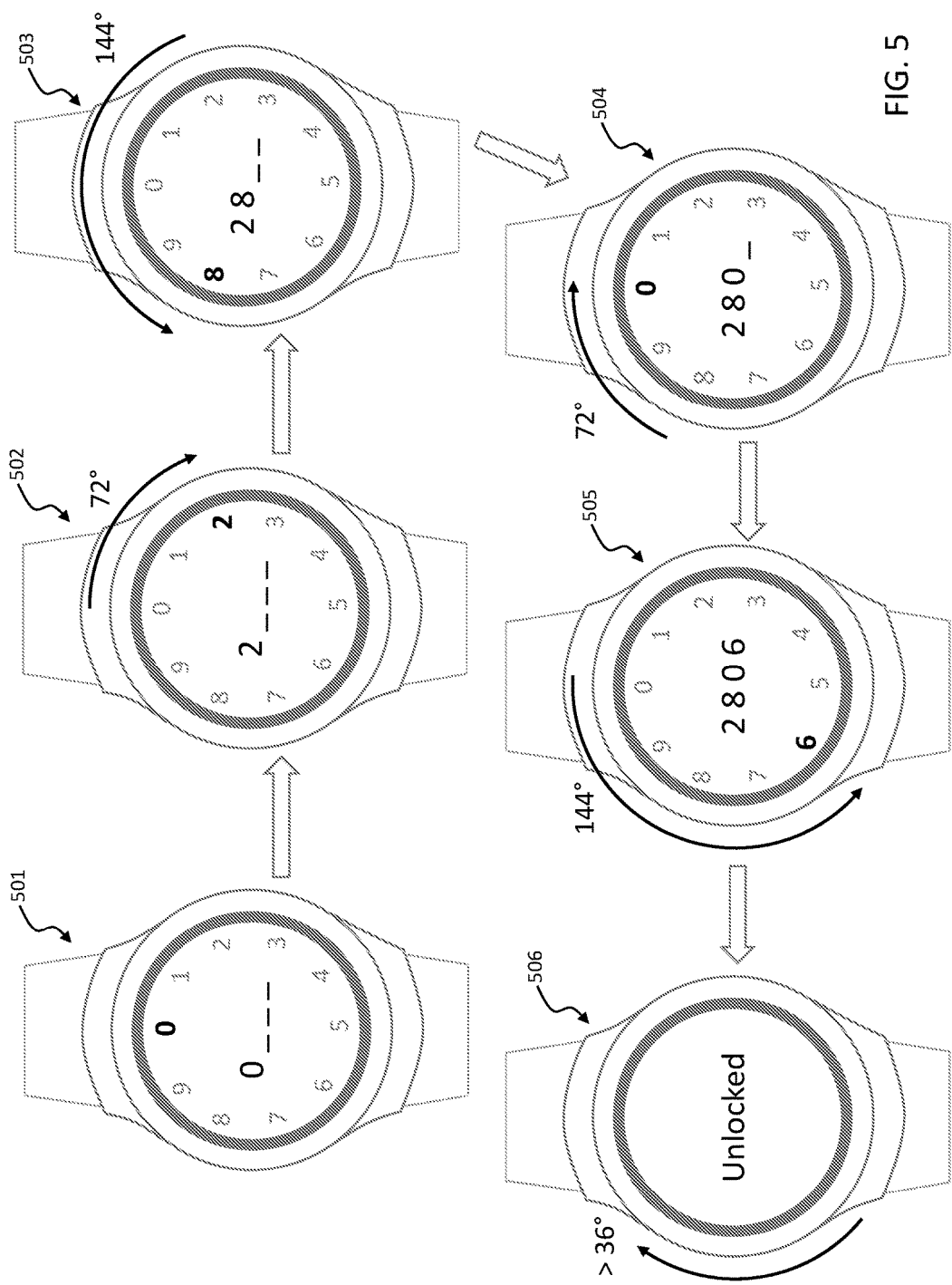
FIG. 5 is a diagram of a user inputting a numerical passcode, according to an example embodiment of the present disclosure.

FIG. 5 is a diagram of a user inputting a passcode, according to an example embodiment of the present disclosure. The user may input the passcode for the purpose of creating the passcode or authenticating it against a previously created passcode. The passcode, for example, may be used to unlock the electronic device or smart watch itself. In the case of FIG. 1, the user may also input the passcode to activate/de-activate the sensors 141, 142 and 143 connected to the security hub 130. In one embodiment, the user may enter the passcode by turning a bezel of his/her smart watch in a first direction for a first digit, then turning the bezel in a second direction that is opposite to the first direction for a second digit, and repeats the process of first direction and second direction for subsequent digits.

For example, referring to FIG. 5, a series of numbers is aligned along the circumference of a user interface of a smart watch. As the user rotates the bezel clockwise or counterclockwise by the predetermined number of degrees (e.g., 36 degrees), the smart watch iteratively selects each number in the series (shown as bolded in this case) in the direction of rotation and updates a digit of the passcode field to correspond to the selected number in the series. For example, the smart watch may initially set the first digit of the passcode field to "0" (at 501). If the passcode to be entered is "2806," the user may rotate the bezel clockwise (e.g., 72 degrees) to select the number "2," in which case the smart watch updates the first digit of the passcode field to the number "2" (at 502). The user may then change the direction of rotation and rotate the bezel counterclockwise (e.g., 144 degrees) to select the number "8" (at 503). When the smart watch detects the change in the direction of rotation, the smart watch enters the number "2" as the first digit of the passcode and updates the second digit of the passcode field with the next selected number "8." Thus, the second digit of the passcode field shows the number "8" while the first digit of the passcode field remains at the number "2."

After selecting the number "8" through counterclockwise rotation of the bezel, the user may again change the direction of rotation and rotate the bezel clockwise (e.g., 72 degrees) to select the number "0" (at 504). If the user over-rotates the bezel and passes the number "0" in a previous pass, the user may continue to rotate the bezel in the same clockwise direction without changing the rotation direction until the number "0" is selected again. When the smart watch detects the change in the direction of rotation, the smart watch enters the number "8" as the second digit of the passcode and updates the third digit of the passcode field with the next selected number "0." Thus, the third digit of the passcode field shows the number "0" while the first digit of the passcode field remains at the number "2" and the second digit of the passcode field remains at the number "8."

After selecting the number "0" through clockwise rotation of the bezel, the user may again change the direction of rotation and rotate the bezel counterclockwise (e.g., 144 degrees) to select the number "6" (at 505). When the smart watch detects the change in the direction of rotation, the smart watch enters the number "0" as the third digit of the passcode and updates the fourth digit of the passcode field with the next selected number "6." Thus, the fourth digit of the passcode field shows the number "6" while the first digit of the passcode field remains at the number "2," the second digit of the passcode field remains at the number "8," and the third digit of the passcode field remains at the number "0."

After selecting the number "6" through counterclockwise rotation of the bezel, the user may again change the direction of rotation and rotate the bezel clockwise (e.g., >36 degrees) to deselect the number "6" (at 506). When the smart watch detects the change in the direction of rotation, the smart watch enters the number "6" as the fourth digit of the passcode. Because the passcode in this case has only four digits, the smart watch determines that the entire passcode has been entered and authenticates the passcode to unlock the smart watch.

It is appreciated that the present system and method may accept any number of digits or characters for a passcode without deviating from the scope of the present disclosure. Accordingly, in view of the foregoing, embodiments of the present disclosure provide an intuitive system and method of user input utilizing a rotatable part.

Figure 6:
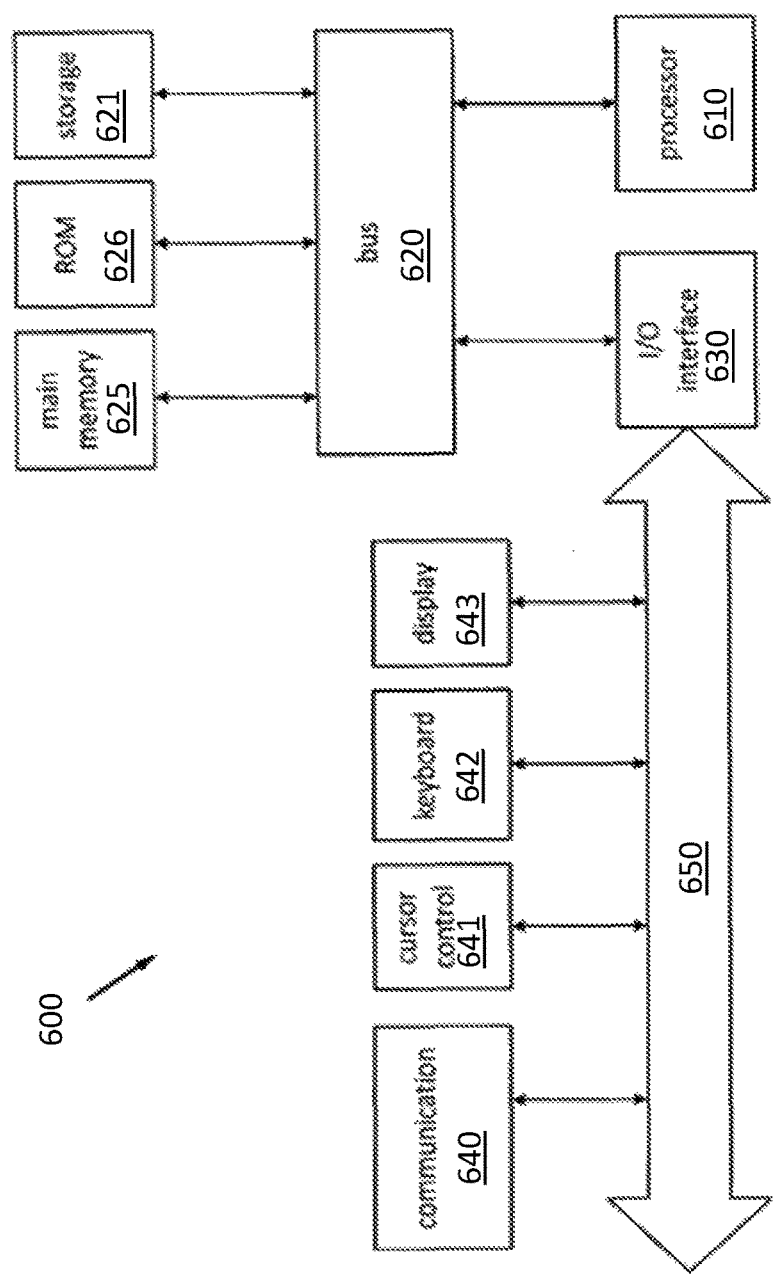
FIG. 6 illustrates an example computer architecture that may be used to implement embodiments of the present disclosure.

FIG. 6 illustrates an example computer architecture that may be used to implement embodiments of the present system and method. The example computer architecture may be used for implementing one or more components described in the present disclosure including, but not limited to, the electronic device and the security hub. One embodiment of architecture 600 comprises a system bus 620 for communicating information, and a processor 610 coupled to bus 620 for processing information. Architecture 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Architecture 600 may also include a read only memory (ROM) and/or other static storage device 626 coupled to bus 620 for storing static information and instructions used by processor 610.

A data storage device 621 such as a magnetic disk or optical disc and its corresponding drive may also be coupled to architecture 600 for storing information and instructions. Architecture 600 can also be coupled to a second I/O bus 650 via an I/O interface 630. A plurality of I/O devices may be coupled to I/O bus 650, including a display device 643, an input device (e.g., an alphanumeric input device 642, a cursor control device 641, and/or a touchscreen device).

The communication device 640 allows for access to other computers (e.g., servers or clients) via a network. The communication device 640 may comprise one or more modems, network interface cards, wireless network interfaces or other interface devices, such as those used for coupling to Ethernet, token ring, or other types of networks.

Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, messaging servers, or personal computers may be used with programs in accordance with the teachings herein, or it may prove convenient to construct a more specialized apparatus to perform the required method steps. The required structure for a variety of these systems appears in the description above. A variety of programming languages may be used to implement the teachings of the disclosure as described herein.

Moreover, the various features of the representative examples and the dependent claims may be combined in ways that are not specifically and explicitly enumerated in order to provide additional embodiments of the present teachings. The dimensions and the shapes of the components shown in the figures are designed to help understand how the present teachings are practiced and do limit the dimensions and the shapes shown in the examples.

What is claimed is:

1. An electronic device comprising:
   a display unit configured to display a passcode field comprising a set of two or more digits, the set of two or more digits corresponding to a set of two or more user input values, each user input value being selected from a predetermined plurality of ordered values, the predetermined plurality of ordered values comprising one of numbers or alphabetical characters and including a given number of ordered values and the predetermined plurality of ordered values having a circular ordering;
   a rotatable part configured to be rotatable clockwise and counterclockwise;
   a computer processor; and
   a communications interface through which the computer processor is configured to control a security hub in communication connection with a plurality of sensors,
   wherein the computer processor is configured to:
      change a current value being displayed for a first user input value to another value among the plurality of ordered values in response to detecting the rotatable part being rotated in a first direction by a first predetermined number of degrees or a multiple of the first predetermined number of degrees, wherein the first predetermined number of degrees comprises 360 divided by the given number of ordered values;
      in response to detecting a change in the rotation direction of the rotatable part, accept the current value being displayed as the first user input value and displaying the accepted value as the first digit in the passcode field and change a current value being displayed in the passcode field for a second user input value to another value among the plurality of ordered values in response to detecting the rotatable part being rotated in a second direction, opposite to the first direction, by the first predetermined number of degrees or a multiple of the first predetermined number of degrees, wherein to accept the current value comprises entering the user input value as part of a security passcode of the electronic device;
      in response to detecting a change in the rotation direction of the rotatable part, accept the current value being displayed as the second user input value and displaying the accepted value as the second digit in the passcode field; and
      in response to receiving digits corresponding to the security passcode for the electronic device, change a security mode of the security hub in response to detecting the rotatable part being rotated a second predetermined number of degrees clockwise or counterclockwise, the second predetermined number of degrees being greater than the first predetermined number of degrees.

2. The electronic device of claim 1, wherein the rotatable part is a bezel.

3. The electronic device of claim 2, wherein the electronic device is a smart watch.

4. The electronic device of claim 1, wherein to change the security mode includes activating an away mode in which the security hub triggers an alarm in response to receiving sensor detection information from a plurality of sensors communicatively connected to the security hub.

5. The electronic device of claim 1, wherein to change the security mode includes activating a home mode in which the plurality of sensors are partially or substantially deactivated.

6. The electronic device of claim 1, wherein the computer processor is further configured to change the current value being displayed for the first or second input value to a next value among the plurality of ordered values in response to detecting the rotatable part being rotated clockwise by a first predetermined number of degrees.

7. The electronic device of claim 6, wherein the computer processor is further configured to change the current value being displayed for the first or second input value to a previous value among the plurality of ordered values in response to detecting the rotatable part being rotated counterclockwise by the first predetermined number of degrees.

8. A method of receiving user input values on an electronic device, the method comprising:
   displaying a passcode field comprising a set of two or more digits, the set of two or more digits corresponding to a set of two or more user input values, each user input value being selected from a predetermined plurality of ordered values, the predetermined plurality of ordered values comprising one of numbers or alphabetical characters and including a given number of ordered values and the predetermined plurality of ordered values having a circular ordering;
   detecting degrees of clockwise and counterclockwise rotation of a rotatable part;
   controlling a security hub in response to detecting degrees of clockwise and counterclockwise rotation of the rotatable part, the security hub being in communication connection with a plurality of sensors;
   changing a current value being displayed for a first user input value to another value among the plurality of ordered values in response to detecting the rotatable part being rotated in a first direction a first predetermined number of degrees, wherein the first predetermined number of degrees comprises 360 divided by the given number of ordered values;
   in response to detecting a change in the rotation direction of the rotatable part, accepting the current value being displayed as the first user input value and displaying the accepted value as the first digit in the passcode field and changing a current value being displayed in the passcode field for a second user input value to another value among the plurality of ordered values in response to detecting the rotatable part being rotated in a second direction, opposite to the first direction, by the first predetermined number of degrees or a multiple of the first predetermined number of degrees, wherein accepting the current value comprises entering the user input value as part of a security passcode of the electronic device;

in response to detecting a change in the rotation direction of the rotatable part, accepting the current value being displayed as the second user input value and displaying the accepted value as the second digit in the passcode field; and in response to receiving digits corresponding to the security passcode for the electronic device, changing a security mode of the security hub in response to detecting the rotatable part being rotated a second predetermined number of degrees clockwise or counterclockwise, the second predetermined number of degrees being greater than the first predetermined number of degrees.

9. The method of claim 8, wherein the rotatable part is a bezel.

10. The method of claim 9, wherein the electronic device is a smart watch.

11. The method of claim 8, wherein changing the security mode includes activating an away mode in which the security hub triggers an alarm in response to receiving sensor detection information from a plurality of sensors communicatively connected to the security hub.

12. The method of claim 8, wherein changing the security mode includes activating a home mode in which the plurality of sensors are partially or substantially deactivated.

13. The method of claim 8, wherein changing the current value being displayed for the first or second input value to a next value among the plurality of ordered values in response to detecting the rotatable part being rotated clockwise by a first predetermined number of degrees.

14. The electronic device of claim 13, wherein changing the current value being displayed for the first or second input value to a previous value among the plurality of ordered values in response to detecting the rotatable part being rotated counterclockwise by the first predetermined number of degrees.

* * * * *